United States Patent Office 3,448,588
Patented June 10, 1969

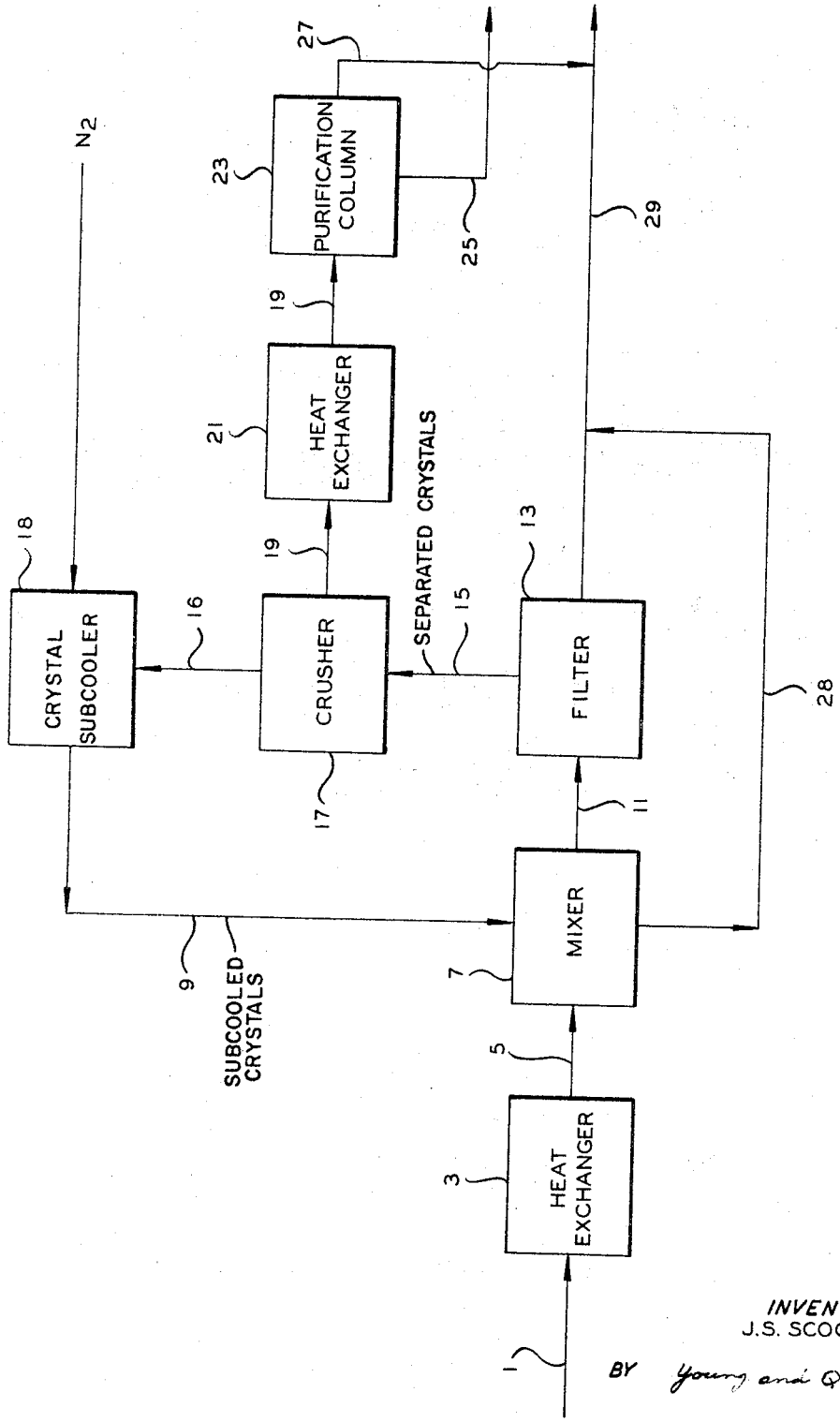

3,448,588
CRYSTALLIZATION OF A LIQUID MIXTURE WITH SUBCOOLED CRYSTALS OF ONE COMPONENT OF THE MIXTURE
Jack S. Scoggin, Bartlesville, Okla., assignor to Phillips Petroleum Company, a corporation of Delaware
Filed July 29, 1966, Ser. No. 568,512
Int. Cl. B01d 9/04
U.S. Cl. 62—58  13 Claims

ABSTRACT OF THE DISCLOSURE

A method of separation of one component from a liquid mixture by crystallization wherein the liquid mixture is cooled with low temperature subcooled crystals of said component.

---

This invention relates to separation by crystallization. In one aspect, the invention relates to separation of a higher freezing point component from a mixture containing said component by contacting the mixture with subcooled crystals of said component. In another aspect, this invention relates to a method for increasing the crystal size of said higher freezing component.

Separation of compounds may be effected by distillation, solvent extraction and crystallization. Although distillation and extraction are generally preferred because of economy and convenience of operation, there are some instances in which such processes can not be successfully utilized. Many chemical isomers have similar boiling points and solubilities and can not be separated satisfactorily by distillation or extraction. Therefore it is necessary to effect such separations by means of fractional crystallization which is well suited to the purification of many compounds which can not be economically purified by other means.

Methods of separating a pure component from a mixture have been devised, whereby the liquid mixture to be separated is introduced into a heat exchange zone wherein a slurry of crystals is formed and that slurry of crystals is then introduced into a purification zone through which the crystals are moved as a compact mass. One such means for purifying crystals has been disclosed by J. Schmidt in Re. Patent 23,810.

Such crystallizing means are employed in crystallizing feedstocks which form very small crystals in scraped-surface chillers. These feedstocks form such small crystals that the throughput of the crystal purification column is reduced.

Therefore, it is an object of this invention to provide a method which enlarges the crystals prior to their entry into a crystal purification means.

Another object of this invention is to provide a method whereby a higher freezing point component A is separated from a fluid mixture containing said component by cooling the mixture with subcooled essentially pure crystals of component A.

Yet another object of the invention is to provide a method for rapidly separating a component having a relatively high solidification point from a mixture which has a relatively low eutectic solidification point.

Other objects and many of the attendant advantages of this invention will be readily appreciated as the same becomes better understood by reference to the following detailed description.

Broadly speaking, this invention resides in a process for separating at least one higher freezing point component from a fluid mixture containing said component, said process comprising the steps of mixing said fluid mixture with esssentially pure subcooled crystals from said mixture; subcooling the separated crystals; recycling a portion of said subcooled crystals to the mixing step and purifying the remaining crystals in a crystal purification column.

Systems consisting of any combination of two or more components selected from different groups may be separated by the process of the subject invention.

For example, benzene may be separated from a benzene, n-hexane or n-heptane system in which the benzene is present in an amount greater than the eutectic concentration. In the same manner, para-xylene may be readily separated from a mixture of para- and meta-xylenes or from para-, meta-, and ortho-xylenes. Benzene may also be separated from a mixture with toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene hydroquinone (1,4-benzenediol), para-cresol, para-dichlorobenzene, and such materials as high melting waxes, fatty acids, and high molecular normal paraffins. The system can also be used to separate anthracene, phenanthrene, and carbazole. Furthermore, the system can be used to separate durene (1,2,4,5-tetramethylbenzene) from $C_{10}$ aromatics. In cases where the material to be purified has a relatively high crystallization point, the impure material is raised to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A more complete understanding of this invention will be obtained on study of the accompanying drawing, which is a schematic representation of the fractional crystallization system of this invention.

With reference to the drawing, a mixture of materials from which at least one constituent is to be separated is fed via conduit 1 through a conventional heat exchanger 3, where the temperature of the mixture is lowered so as to be near the initial freezing point of the mixture. As will be apparent from the discussion hereinabove, the temperature to which the mixture is adjusted in the heat exchanger will depend entirely upon the specific mixture, since the various materials have different freezing points and the freezing point of any given constituent of a mixture is dependent upon the constitution of the mixture.

The chilled liquid mixture is passed via conduit 5 to a mixing vessel 7. This mixer can be equipped with a conventional auger conveying system which will mix the liquid with subcooled crystals of the constituent to be removed from the mixture. A slurry of crystals and mother liquor is formed in vessel 7. These subcooled crystals are introduced into the mixer 7 via conduit 9. These subcooled crystals are at a temperature in the range 0 to 500° F., preferably 50 to 300° F. below the eutectic point of the mixture.

The crystal slurry is passed from the mixer 7 via conduit 11 to filter 13 wherein uncrystallized material is separated from the crystals. The mother liquor is removed from filter 13 via line 29. Some mother liquor can be removed from mixer 7 by decantation, filtration, and the like, and bypass filter 13 via conduit 28. The amount of uncrystallized materials (mother liquor) which is left on the crystals is dependent upon the specific type of filter which is utilized. Any one of several different types of filters can be used for this step in my process. A rotary type filter, such as an Oliver filter or one of the higher speed types, such as a centrifuge, can be utilized or a pressure type filter in which the crystals are compacted by some compacting means, such as a piston, can be used. Crystals are passed from filter 13 via conduit 15 to a crusher 17 wherein any exceedingly large size crystals are reduced in size. This crusher can comprise press rollers or the like. The crystals are then passed via conduit 16 to an insulated vessel 18 wherein they are suspended and/or cooled by being contacted with a medium such as liquid nitrogen, or the like.

In another embodiment, only a portion of the crushed crystals is passed via conduit 16 to vessel 18 and back to the mixer 7 via conduit 9.

The remaining crushed crystals are passed via conduit 19 through a heat exchanger 21 (wherein they are cooled) into purification column 23.

The purification column purifies the crystals so that the pure component is removed via line 25 and the mother liquor is removed via line 27 and combined with that in conduit 29.

In order to better illustrate my invention, I have provided the following example which exemplifies the invention but should not be construed to unduly limit it.

*Example*

A feed stream of beer is concentrated according to the method described hereinabove.

MATERIAL BALANCE. LBS.

| | Conduit | | | | | | | |
|---|---|---|---|---|---|---|---|---|
| | 5 | 9 | 11 | 29 | 15 | 19 | 25 | 27 |
| Water | 9,140 | | 4,840 | 2,960 | 1,880 | 960 | 950 | 5,230 |
| Ice crystals | | ¹5,200 | 9,500 | | 9,500 | 5,220 | | |
| Ethyl alcohol | 360 | 80 | 440 | 270 | 170 | 90 | 85 | 5 |
| Sugars | 500 | 120 | 620 | 370 | 250 | 130 | 123 | 7 |
| | 10,000 | 5,400 | 15,400 | 3,600 | 11,800 | 7,400 | 1,158 | 5,242 |

¹ At −320° F.

It is readily observed that by operating in the manner taught hereinabove, it is possible to utilize the principle of freeze crystallization wherein the problems of employing a scraper chiller to form the slurry of crystals is eliminated. This method permits the formation of larger crystals than is possible with a scraper chiller. This is because the crystals added to mixer 7 via line 9 will grow when contacted with fresh feedstock. There are no scrapers in mixer 7 which form crystal nuclei and consequently small crystals.

Obviously many modifications and variations of the present invention are possible in the light of the above techniques. It is therefore to be understood that within the scope of the appended claims the invention may be practiced otherwise than as specifically described herein.

What is claimed is:
1. A process for separating and purifying one component which exists in liquid admixture with other components in a mixture and is separable therefrom by crystallization, said process comprising the steps of:
    (a) contacting the mixture in a mixing zone with subcooled crystals of said one component of the mixture, thereby cooling the mixture to cause crystallization of said one component therefrom;
    (b) separating the crystals from the mixture;
    (c) cooling a portion of the separated crystals to provide the previously-identified subcooled crystals; and
    (d) purifying the remaining crystals.
2. The process of claim 1 wherein the mixture has a eutectic point and said crystals added to the mixing zone are from 0 to about 500° F. below the eutectic point of the mixture.
3. The process of claim 2 wherein said mixture comprises ortho, meta and para xylenes.
4. The process of claim 2 wherein said mixture comprises ortho, meta and para cymenes.
5. The process of claim 2 wherein said mixture comprises dimethyl phthalate, dimethyl isophthalate and dimethyl terephthalate.
6. The process of claim 1 wherein the mixture has a eutectic point and said crystals added to the mixing zone are from 50 to 300° F. below the eutectic point of the mixture.
7. The process of claim 1 wherein the mixture is initially precooled in a heat exchanger to just above the temperature of initial formation of crystals.
8. A process of claim 1 wherein said mixture comprises 2,2-dimethylpentane, 2,4-dimethylpentane, 2,2,3-trimethylbutane, methylcyclohexane, 2,2,4-trimethylpentane.
9. A process for concentrating an aqueous solution having a eutectic point which comprises the steps of:
    (a) contacting said aqueous solution with subcooled ice crystals in a mixing zone, the temperature of said subcooled ice crystals being 50 to 300° F. below the eutectic point of said aqueous solution, thereby crystallizing water contained in said aqueous solution and concentrating the solution;
    (b) separating the resultant crystals from the concentrated solution;
    (c) cooling a portion of the separated crystals to a temperature of 50 to 300° F. below the eutectic point and recycling said portion to the mixing zone;
    (d) purifying the balance of the separated crystals; and
    (e) recovering the separated concentrated aqueous solution.
10. The process of claim 9 wherein the said resultant crystals separated from the concentrated solution are crushed before conducting a portion to be cooled and the other portion to be purified.
11. The process of claim 9 wherein the subcooled crystals are ice and are subcooled to a tempertture of about 320° F.
12. The process of claim 9 wherein the mixture is initially precooled in a heat exchanger to just above the temperature of the initial formation of crystals.
13. The process of claim 9 wherein said aqueous solution is beer containing about 4–6% sugars, about 3–4% alcohol, balance essentially water, and wherein the concentrated aqueous solution separated and recovered con- tains about 9–12% sugars, 6–9% alcohol, balance essentially water.

References Cited

UNITED STATES PATENTS

| | | | |
|---|---|---|---|
| 2,896,419 | 7/1959 | Thompson | 62—58 |
| 2,986,012 | 5/1961 | Toulmin | 62—58 |
| 3,170,778 | 2/1965 | Roth | 62—58 |
| 3,232,218 | 1/1966 | Soussloff | 62—58 |
| 3,285,022 | 11/1966 | Pike | 62—58 |
| 3,285,025 | 11/1966 | Shaul | 62—58 |
| 3,327,492 | 6/1967 | Goard | 62—58 |
| 2,790,018 | 4/1957 | Bennett | 260—707 |
| 3,182,463 | 5/1965 | Stearns | 62—58 |

NORMAN YUDKOFF, *Primary Examiner.*

U.S. Cl. X.R.

23—301; 99—31, 199; 260—674, 475, 707